United States Patent
Newton et al.

(10) Patent No.: US 9,918,069 B2
(45) Date of Patent: Mar. 13, 2018

(54) METHOD AND DEVICE FOR OVERLAYING 3D GRAPHICS OVER 3D VIDEO

(71) Applicant: KONINKLIJKE PHILIPS N.V., Eindhoven (NL)

(72) Inventors: Philip Steven Newton, Eindhoven (NL); Markus Jozef Maria Kurvers, Elndhoven (NL); Dennis Daniel Robert Jozef Bolio, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 15/236,553

(22) Filed: Aug. 15, 2016

(65) Prior Publication Data

US 2016/0353081 A1    Dec. 1, 2016

Related U.S. Application Data

(63) Continuation of application No. 13/139,925, filed as application No. PCT/IB2009/055726 on Dec. 14, 2009, now abandoned.

(30) Foreign Application Priority Data

Dec. 19, 2008    (EP) .................................... 08172411

(51) Int. Cl.
  *H04N 7/12*    (2006.01)
  *H04N 15/00*   (2006.01)
  (Continued)

(52) U.S. Cl.
  CPC ... *H04N 13/0055* (2013.01); *G11B 20/00007* (2013.01); *G11B 20/10527* (2013.01);
  (Continued)

(58) Field of Classification Search
  CPC ............. G09G 3/3406; G09G 2360/18; H04N 13/0497
  See application file for complete search history.

(56) References Cited

U.S. PATENT DOCUMENTS 6,069,650 A    5/2000  Battersby
6,111,979 A    8/2000  Katto
(Continued)

FOREIGN PATENT DOCUMENTS

EP    0777393 A2    6/1997
JP    06335029 A    12/1994
(Continued)

OTHER PUBLICATIONS

Blue Ray Disc White Paper Mar. 2005.
(Continued)

*Primary Examiner* — Tsion B Owens

(57) ABSTRACT

A method of decoding and outputting video information suitable for three-dimensional [3D] display, the video information comprising encoded main video information suitable for displaying on a 2D display and encoded additional video information for enabling three-dimensional [3D] display, the method comprising: receiving or generating three-dimensional [3D] overlay information to be overlayed over the video information; buffering a first part of the overlay information to be overlayed over the main video information in a first buffer; buffering a second part of overlay information to be overlayed over the additional video information in a second buffer; decoding the main video information and the additional video information and generating as a series of time interleaved video frames, each outputted video frame being either main video frame or additional video frame; determining a type of an video frame to be outputted being either a main video frame or an additional video frame; overlaying either first or second part of the overlay infor-
(Continued)

mation on an video frame to be outputted in agreement with the determined type of frame outputting the video frames and the overlayed information.

20 Claims, 3 Drawing Sheets

(51) Int. Cl.
H04N 13/00 (2018.01)
H04N 19/597 (2014.01)
G11B 20/00 (2006.01)
G11B 20/10 (2006.01)
G11B 27/036 (2006.01)

(52) U.S. Cl.
CPC ......... *G11B 27/036* (2013.01); *H04N 13/004* (2013.01); *H04N 13/007* (2013.01); *H04N 13/0048* (2013.01); *H04N 19/597* (2014.11); *G11B 2020/00072* (2013.01); *G11B 2020/1062* (2013.01); *H04N 13/0003* (2013.01)

(56) References Cited

U.S. PATENT DOCUMENTS

| | | | |
|---|---|---|---|
| 6,144,701 | A | 11/2000 | Chiang et al. |
| 6,573,819 | B1 | 6/2003 | Oshima et al. |
| 2002/0009137 | A1 | 1/2002 | Nelson |
| 2003/0103062 | A1 | 6/2003 | Lee |
| 2005/0191035 | A1 | 9/2005 | Jung |
| 2006/0110111 | A1 | 5/2006 | Van Gestel |
| 2006/0269226 | A1* | 11/2006 | Ito .................. H04N 13/004 386/337 |
| 2007/0097208 | A1 | 5/2007 | Takemoto |
| 2009/0315979 | A1* | 12/2009 | Jung .................. H04N 13/0003 348/43 |
| 2010/0118119 | A1* | 5/2010 | Newton ............... H04N 13/007 348/42 |
| 2010/0208043 | A1* | 8/2010 | Hoffman ............. G09G 3/3406 348/53 |
| 2011/0249757 | A1 | 10/2011 | Newton et al. |
| 2011/0261877 | A1 | 10/2011 | Choi et al. |
| 2012/0170917 | A1* | 7/2012 | Yamashita ............ H04N 5/775 386/355 |

FOREIGN PATENT DOCUMENTS

| | | |
|---|---|---|
| JP | 201186515 A | 7/2001 |
| WO | 2004053875 A2 | 6/2004 |
| WO | 2007113725 A2 | 10/2007 |
| WO | 2008044191 A2 | 4/2008 |
| WO | 2008115222 A1 | 9/2008 |

OTHER PUBLICATIONS

"Application Definition Blu-Ray Disc Formal BD-J Baseline Application and Logical Model Definition for BD-ROM" Mar. 1, 2005.

* cited by examiner

METHOD AND DEVICE FOR OVERLAYING 3D GRAPHICS OVER 3D VIDEO

CROSS-REFERENCE TO PRIOR APPLICATIONS

This application claims the benefit or priority of and describes relationships between the following applications: wherein this application is a continuation of U.S. patent application Ser. No. 13/139,925 filed Jun. 15, 2011, which is the National Stage of International Application No. PCT/IB2009/055726, filed Dec. 14, 2009, which claims the priority of foreign application EP08172411.4 filed Dec. 19, 2008, all of which are incorporated herein in whole by reference.

FIELD OF THE INVENTION

The invention relates to a method of decoding and outputting video information suitable for three-dimensional [3D] display, the video information comprising encoded main video information suitable for displaying on a 2D display and encoded additional video information for enabling three-dimensional [3D] display, 3D overlay information being overlayed onto the video information.

The invention further relates to a device for decoding and outputting video information suitable for three-dimensional [3D] display, the video information comprising encoded main video information suitable for displaying on a 2D display and encoded additional video information for enabling three-dimensional [3D] display, the device adapted to overlay 3D overlay information onto the video information.

The invention relates to the field playback of 3D video information and 3D overlay information by a playback device, the information to be displayed onto a 3D enabled display.

BACKGROUND OF THE INVENTION

Devices for rendering video data are well known, for example video players like DVD players, BD players or set top boxes for rendering digital video signals. The rendering device is commonly used as a source device to be coupled to a display device like a TV set. Image data is transferred from the source device via a suitable interface like HDMI.

With respect to the coded video information stream, for example this may under the format known as stereoscopic, where left and right (L+R) images are encoded. Alternatively, coded video information stream may comprise a 2D picture and an additional picture (L+D), a so-called depth map, as described in Oliver Sheer—"3D Video Communication", Wiley, 2005, pages 29-34. The depth map conveys information about the depth of objects in the 2D image. The grey scale values in the depth map indicate the depth of the associated pixel in the 2D image. A stereo display can calculate the additional view required for stereo by using the depth value from the depth map and by calculating the required pixel transformation. The 2D video+depth map may be extended by adding occlusion and transparency information (DOT).

Currently in 3D systems, a known solution for the output video data to be transferred via the HDMI interface to the 3D display is time interleaving, wherein frames corresponding tot Left or 2D information are interleaved with Right or DOT frames.

It is known that, for 2D video systems, application formats like for distribution of video content and playback device support overlay or real time generated graphics on top of the video. Overlay graphics are for example internally generated by the player device for on screen display ( ) SD) menus, or received, such as subtitles or other graphics.

However extending the known overlay models to 3D systems creates the problem that the performance requirements of drawing routines for the real-time generated overlay graphics are increased.

SUMMARY OF THE INVENTION

It is an object of the invention to provide a method for decoding and outputting video information and overlay information which is suitable for 3D systems For this purpose, according to a first aspect of the invention, in the method as described in the opening paragraph, the method further comprises receiving or generating three-dimensional [3D] overlay information to be overlayed over the video information; buffering a first part of the overlay information to be overlayed over the main video information in a first buffer; buffering a second part of overlay information to be overlayed over the additional video information in a second buffer; decoding the main video information and the additional video information and generating as a series of time interleaved video frames, each outputted video frame being either main video frame or additional video frame; determining a type of an video frame to be outputted being either a main video frame or an additional video frame; overlaying either first or second part of the overlay information on an video frame to be outputted in agreement with the determined type of frame-outputting the video frames and the overlayed information.

For this purpose, according to a second aspect of the invention, the device described in the opening paragraph comprises input means for receiving three-dimensional [3] overlay information to be overlayed over the video information or generation means for generating three-dimensional [3] overlay information to be overlayed over the video information a decoder for decoding the main video information and the additional video information, the decoder further adapted to generate as a series of time interleaved video frames, each outputted video frame being either main video frame or additional video frame; means for receiving or generating three-dimensional [3] overlay information to be overlayed over the video information; a graphics processing unit comprising a first buffer for buffering a first part of the overlay information to be overlayed over the main video information and a second buffer for buffering a second part of overlay information to be overlayed over the additional video information; the graphics processing unit further comprising a controller for determining a type of a video frame to be outputted being either a main video frame or an additional video frame; a mixer for overlaying either first or second part of the overlay information on a video frame to be outputted in agreement with the determined type of frame; output means for outputting the video frames and the overlayed information.

The invention is also based on the following recognition. 3D Overlay graphics can no longer simply be composited with the 3D video output in systems outputting frames corresponding tot Left or 2D information interleaved with Right or DOT frames, since the 3D video output switches between the two different video streams each frame. As an example, at time T the video output could contain the 2D frame, and at time T+1 the video output contains accompanying depth information for the frame at time T. The graphics that need to be composited with the video at time T (the 2D graphics) greatly differ from the graphics that need to be composited with the video at time T+1 (the depth graphics or the R graphics). The graphics unit present in 2D video player devices is not fast enough to frame accurately update its graphics plane with these different graphics every frame. The solution according to the invention is to implement two buffers in the graphics unit. Each buffer is assigned to one of the output video streams. For example, for 2D+depth drawing, one buffer could be assigned for graphics overlay over the 2D frame and one buffer could be assigned for the graphics overlay over the depth frame. For L+R, similarly, one buffer could be used for graphics overlay over the L frame, and one buffer could be assigned for overlay over the R frame. The advantage of this solution is that the slow graphics are decoupled from the frame accurate overlaying engine, so that the processing requirements are significantly reduces.

Advantageously, the graphics control unit further comprises a controller which is adapted to copy parts of a first overlay frame in the first buffer or parts of a second overlay frame in the second buffer at frame frequency for generating an overlay frame. When the player device handles 2D+DOT depth streams, this enables fast generation of occlusion data, by copying the relevant areas from the buffered frames.

BRIEF DESCRIPTION OF THE DRAWINGS

These and other aspects of the invention will be apparent from and elucidated further with reference to the embodiments described by way of example in the following description and with reference to the accompanying drawings, in which.

In the Figures, elements which correspond to elements already described have the same reference numerals.

DETAILED DESCRIPTION OF EMBODIMENTS

Figure 1:
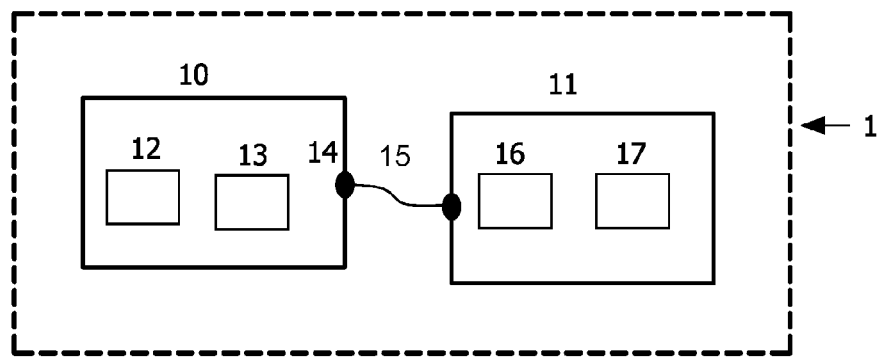
FIG. 1 shows schematically a system for receiving and displaying 3D video information in parts of which the invention may be practiced

A system 1 for playback of 3D video information wherein the invention may be practiced is shown in FIG. 1.

The system comprises a player device 10 and a display device 11 communicating via an interface 15. The player device 10 comprises a front end unit 12 responsible for receiving and pre-processing the coded video information stream to be displayed, and a processing unit for decoding, processing and generation a video stream to be supplied to the output 14. The display device comprises a rendering unit for rendering 3D views from the received.

With respect to the coded video information stream, for example this may be under the format known as stereoscopic, where left and right (L+R) images are encoded. Alternatively, coded video information stream may comprise a 2D picture and an additional picture (L+D), a so-called depth map, as described in Oliver Sheer-"*3D Video Communication*", Wiley, 2005, pages 29-34. The depth map conveys information about the depth of objects in the 2D image. The grey scale values in the depth map indicate the depth of the associated pixel in the 2D image. A stereo display can calculate the additional view required for stereo by using the depth value from the depth map and by calculating the required pixel transformation. The 2D video+depth map may be extended by adding occlusion and transparency information (DOT). In a preferred embodiment, a flexible data format comprising stereo information and depth map, adding occlusion and transparency, as described in EP 08305420.5, to be included herein by reference, is used.

With respect to the display device 11, this can be either a display device that makes use of controllable glasses to control the images displayed to the left and right eye respectively, or, in a preferred embodiment, the so called autostereoscopic displays are used. A number of auto-stereoscopic devices that are able to switch between 2D and 3 D displays are known, one of them being described in U.S. Pat. No. 6,069,650. The display device comprises an LCD display comprising actively switchable Liquid Crystal lenticular lens. In auto-stereoscopic displays processing inside a rendering unit 16 converts the decoded video information received via the interface 12 from the player device 10 to multiple views and maps these onto the sub-pixels of the display panel 17. It is duly noted that the rendering unit 16 may reside either inside the player device 10, in such case the multiple views being sent via the interface.

With respect to the player device 10, this may be adapted to read the video stream from an optical disc, another storage media such as flash, or receive the video information via wired or wireless network, such as an internet connection. A known example of a Blu-Ray™ player is the PlayStation™ 3, as sold by Sony Corporation.

In case of BD systems, further details can be found in the publicly available technical white papers "Blu-ray Disc Format General August 2004" and "Blu-ray Disc 1.0 Physical Format Specifications for BD-ROM November, 2005", published by the Blu-Ray Disc association (http://www.blu-raydisc.com).

In the following, when referring to the BD application format, we refer specifically to the application formats as disclosed in the US application No. 2006-0110111 and in white paper "Blu-ray Disc Format 2.B Audio Visual Application Format Specifications for BD-ROM, March 2005" as published by the Blu-ray Disc Association.

It is known that BD systems also provide a fully programmable application environment with network connectivity thereby enabling the Content Provider to create interactive content. This mode is based on the Java™( )3 platform and is known as "BD-J". BD-J defines a subset of the Digital Video Broadcasting (DVB)-Multimedia Home Platform (MHP) Specification 1.0, publicly available as ETSI TS 101 812.

Figure 2:
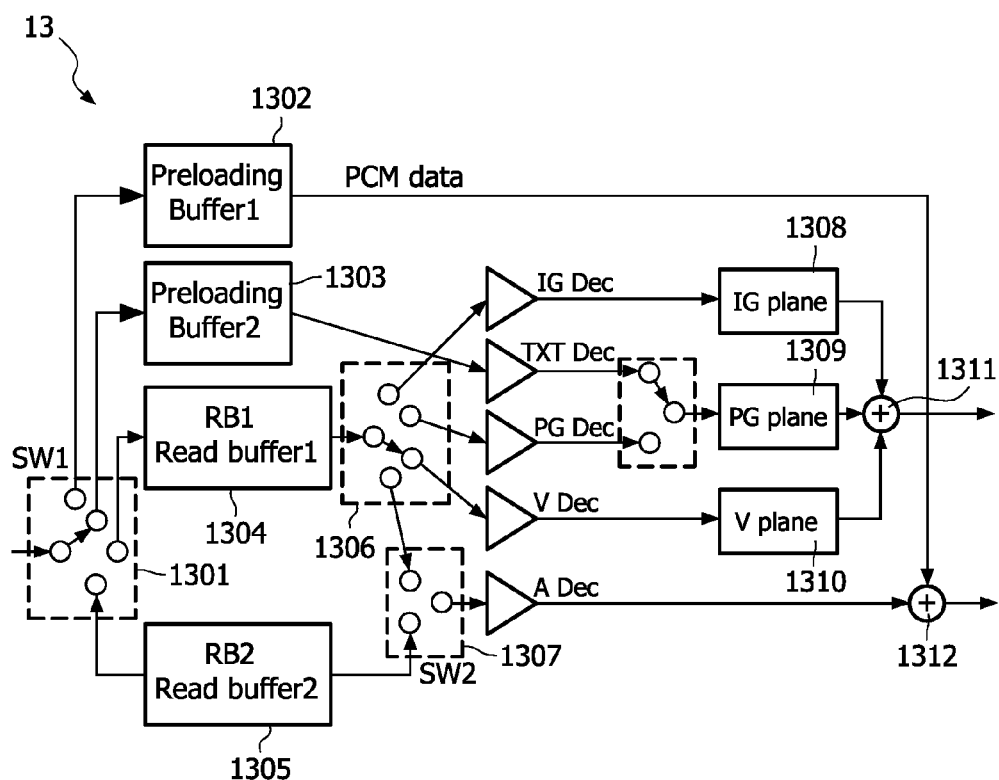
FIG. 2 shows schematically a graphics processing unit of a known 2D video player.

FIG. 2 illustrates a graphics processing unit (part of the processing unit 13) of a known 2D video player, namely a Blu-Ray player. The graphics processing unit is equipped with two read buffers (1304 and 1305), two preloading buffers (1302 and 1303) and two switches (1306 and 1307). The second read buffer (1305) enables the supply of an Out-of-Mux audio stream to the decoder even while the main MPEG stream is being decoded. The preloading buffers cache Text subtitles, Interactive Graphics and sounds effects (which are presented at Button selection or activation). The preloading buffer 1303 stores data before movie playback begins and supplies data for presentation even while the main MPEG stream is being decoded.

This switch 1301 between the data input and buffers selects the appropriate buffer to receive packet data from any one of read buffers or preloading buffers. Before starting the main movie presentation, effect sounds data (if it exists), text subtitle data (if it exists) and Interactive Graphics (if preloaded Interactive Graphics exist) are preloaded and sent to each buffer respectively through the switch. The main MPEG stream is sent to the primary read buffer (1304) and the Out-of-Mux stream is sent to the secondary read buffer (1305) by the switch 1301.

Figure 3:
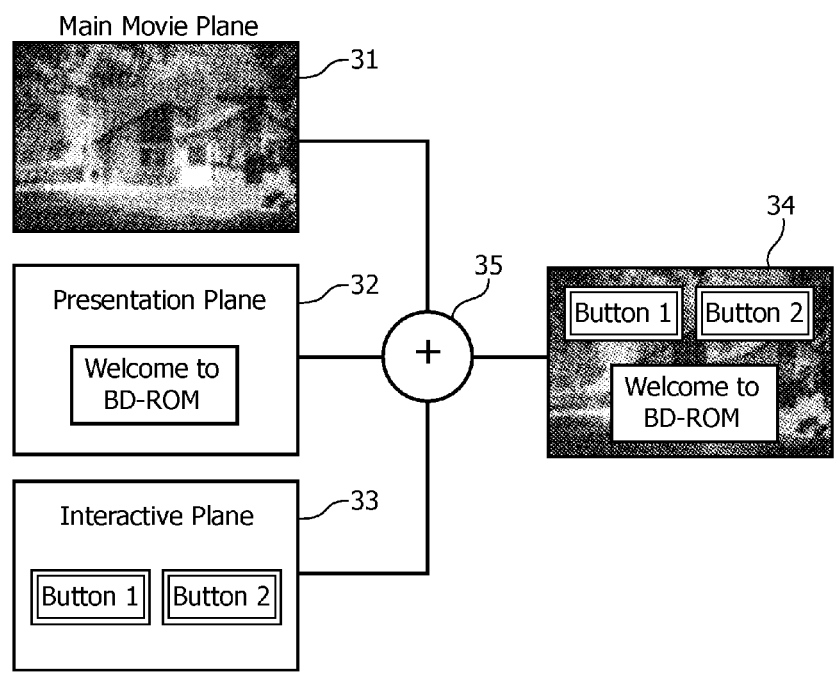
FIG. 3 shows schematically the composition of video planes in known Blu-Ray (BD) systems.

FIG. 3 shows schematically the composition of video planes in known Blu-Ray (BD) systems.

As shown, two independent full graphics planes (32, 33) for graphics which are composited on the video plane (31) are present. One graphics plane (32) is assigned for subtitling applications (Presentation Graphics or Text Subtitles) and the other plane is assigned to interactive applications (33) (HDMV or BD-J mode interactivity graphics).

Returning to FIG. 3, the main video plane (1310) and the presentation (1309) and graphics plane (1308) are supplied by the corresponding decoders, and the three planes are ovelayed by an overlayer 1311 and outputted.

Figure 4:
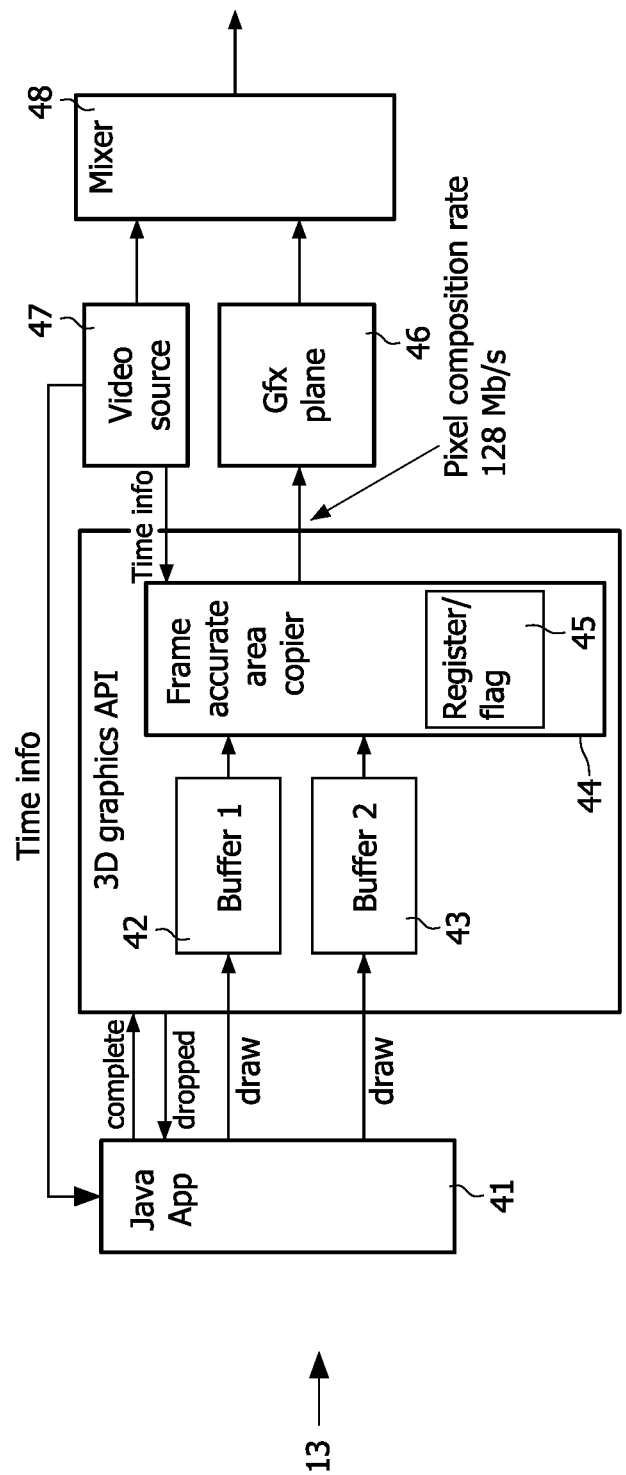
FIG. 4 illustrates schematically a graphics processing unit according to the invention.

FIG. 4 illustrates schematically a graphics processing unit (13) according to the invention. This specific example constitutes an improvement of the known graphics processing unit in BD systems, but the concepts described herein are directly applicable to all graphics processing unit in video players, as the decoder models for various type of video players are similar.

For clarity, the overlaying of one graphics plane over the main video plane will be discussed, but the concept is directly applicable to overlaying more than one graphics plane.

For 3D video, extra information is needed besides the 2D video that is stored and sent to the display in normal Blu-ray movies. For stereoscopic 3D, it is necessary to send both the left view and the right view to the stereoscopic display. The display then uses a certain technique to make sure only the left eye of the viewer sees the left picture and only the right eye sees the right picture. Common techniques to achieve this are shutter glasses or polarized glasses.

Autostereoscopic displays requires a different interface format: the 2D+depth video format. Besides the 2D video, an additional video stream is used to send depth information. The display combines the video stream in the rendering stage and calculates the resulting 3D picture.

For both 3D techniques it is necessary to send the 2 video streams to the display in a certain interface format, which depends on the display type. A possible interface format is sending the frames from both video streams time interleaved to the display. This means that at time T a frame from the first video stream (left or 2D) is sent, and at time T+1 a frame from the second video stream (right or depth) is sent.

Application formats like Blu-ray format as mentioned above, support overlay graphics on top of the video. Overlay graphics are for example used to display subtitles of create a selection menu. Blu-ray overlay graphics are read from disc (presentation graphics and interactive graphics) or generated in real time (BD-J graphics, OSD displays and text based subtitles).

Outputting the video in a time-sequential interface format greatly affects the performance requirements of drawing routines for the real-time generated overlay graphics, in particular that of BD-J graphics. This is because the graphics plane can no longer simply be composited with the video output, since the video output switches between the two different video streams each frame. As an example, at time T the video plane could contain the 2D view, and at time T+1 the video plane contains accompanying depth information for the frame at time T. The BD-J graphics that need to be composited with the video at time T (the 2D graphics) greatly differ from the BD-J graphics that need to be composited with the video at time T+1 (the depth graphics).

A graphics processing unit, in particular the BD-J drawing is not fast enough to frame accurately update its graphics plane with these different graphics every frame. The solution according to the invention is to implement two buffers in the graphics unit. Each buffer is assigned to one of the output video streams. For example, for 2D+depth drawing, one buffer could be assigned for graphics overlay over the 2D frame and one buffer could be assigned for the graphics overlay over the depth frame. For L+R, similarly, one buffer could be used for graphics overlay over the L frame, and one buffer could be assigned for overlay over the R frame. The advantage of this solution is that the slow graphics are decoupled from the frame accurate overlaying engine, so that the processing requirements are significantly reduces.

In FIG. 4, a Java application 41 is shown running on a Java Virtual machine generating overlay information and sending it to the graphics processing unit (API). It is noted that the source of the overlay information is not important, such overlay information for a graphics plane could be other graphics from disc or OSD (On Screen display) information. The graphics processing unit comprises two buffers 42 and 43. Each buffer communicates with a controller (45), the controller preferably comprising a frame accurate area copier. Timing information is sent from the drawing application (41) and from the video decoder (47) graphics processing unit. Based on the received timing information, the frame accurate area copier then can composite the correct buffer onto the graphics output plane, according to what video frame is currently being decoded onto the video output plane (this is known by the Time info from the video source). By doing this, the frame accurate area copier ensures that the mixer composites the correct BD-J graphics over the video frame that is currently outputted (for 2D+depth this means that the 2D graphics buffer is copied onto the graphics plane when a 2D video frame is decoded, and the depth DOT graphics buffer is copied onto the graphics plane when a depth frame is decoded). For L+R graphics, this ensures that L real time graphics is overlayed over the L frame and the R real time graphics is overlayed over the R frame.

It is to be noted that the invention may be implemented in hardware and/or software, using programmable components. A method for implementing the invention has the processing steps corresponding to the rendering system elucidated with reference to FIG. 1. Although the invention has been mainly explained by embodiments using optical record carriers or the internet, the invention is also suitable for any image processing environment, like authoring software or broadcasting equipment. Further applications include a 3D personal computer [PC] user interface or 3D media center PC, a 3D mobile player and a 3D mobile phone.

It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software, and a processor may fulfill the function of one or more units, possibly in cooperation with hardware elements.

Further, the invention is not limited to the embodiments, and lies in each and every novel feature or combination of features described above.

The invention claimed is:

1. A method of decoding and outputting video information suitable for three-dimensional (3D) display, the video information comprising main video information and additional video information, the method comprising:
   receiving 3D overlay information;
   buffering in a first buffer a first part of the 3D overlay information;
   buffering in a second buffer a second part of the 3D overlay information;
   decoding the main video information and the additional video information;
   generating a series of time interleaved video frames, wherein each video frame has a type;
   determining the type of a video frame, wherein the type is one of a main video frame or an additional video frame;
   when the type of the video frame is the main video frame, overlaying the first part of the 3D overlay information over the main video information, and when the type of the video frame is the additional video frame, overlaying the second part of the 3D overlay information over the additional video information, to produce an overlayed video frame; and
   outputting the overlayed video frame,
   wherein the video information is updated at a video rate,
   wherein the first part of the overlay information and the second part of the overlay information is updated at an overlay rate,
   wherein the overlay rate is different than the video rate.

2. The method according to claim 1 wherein the main video information is a left video frame and the additional video information is a right video frame.

3. The method according to claim 1 wherein the 3D overlay information is real time graphics.

4. The method according to claim 3, wherein the real time graphics is generated by a Java application running on a Java Virtual machine.

5. The method according to claim 1, wherein timing information is used to control the overlaying of the first part of the 3D overlay information or the second part of the 3D overlay information over the video frame in agreement with the determined type of frame.

6. The method according to claim 1 wherein the additional video information comprises depth information.

7. The method according to claim 1 wherein the additional video information further comprises depth and occlusion information.

8. The method according to claim 1 wherein the overlay rate is slower than the video rate.

9. The method according to claim 1,
   wherein the video information is arranged for three-dimensional display,
   wherein the main video information is arranged for displaying on a two-dimensional display,
   wherein the additional video information is arranged to enable three-dimensional display.

10. A device for decoding and outputting video information suitable for three-dimensional (3D) display, wherein the video information comprises main video information and additional video information, the device comprising:
    an input circuit arranged to receive 3D overlay information;
    a decoder circuit for decoding the main video information and the additional video information,
       wherein the decoder is arranged to generate a series of time interleaved video frames,
       wherein each video frame has a type;
    a graphics processing circuit comprising a first buffer, a second buffer, and a controller circuit,
       wherein the first buffer is arranged to buffer a first part of the 3D overlay information, and the second buffer is arranged to buffer a second part of 3D overlay information,
       wherein the controller circuit determines the type of a video frame,
       wherein the type is one of a main video frame comprising main video information and an additional video frame comprising additional video information;
    a mixer circuit arranged to overlay the first part of the 3D overlay information over the main video information when the type of the video frame is the main video frame, and to overlay the second part of the 3D overlay information over the additional video information when the type of the video frame is the additional video frame, to produce an overlayed video frame; and
    an output circuit for outputting the overlayed video frame,
    wherein the video information is updated at a video rate,
    wherein the first part of the 3D overlay information and the second part of the 3D overlay information is updated at an overlay rate,
    wherein the overlay rate is different than the video rate.

11. The device according to claim 10 wherein the main video information is a left video frame and the additional video information is a right video frame.

12. The device according to claim 10 wherein the 3D overlay information is real time graphics.

13. The device according to claim 12, wherein the real time graphics is generated by a Java application running on a Java Virtual machine.

14. The device according to claim 10, wherein timing information is used to control the overlaying the first part of the 3D overly information or the second part of the 3D overlay information over the video frame in agreement with the determined type of frame.

15. The device according to claim 10 wherein the additional video information comprises depth information.

16. The device according to claim 10 wherein the additional video information further comprises depth and occlusion information.

17. The device according to claim 10 wherein the controller circuit is arranged to copy parts of a first overlay frame in the first buffer or parts of a second overlay frame in the second buffer at the overlay rate.

18. The device according to claim 10 wherein the overlay rate is slower than the video rate.

19. The method according to claim 10,
    wherein the video information is arranged for three-dimensional display,
    wherein the main video information is arranged for displaying on a two-dimensional display,
    wherein the additional video information is arranged to enable three-dimensional display.

20. A device for decoding and outputting video information suitable for three-dimensional (3D) display, wherein the video information comprises main video information and additional video information, the device comprising:
    an input circuit arranged to generate 3D overlay information;

a decoder circuit for decoding the main video information and the additional video information,
wherein the decoder is arranged to generate a series of time interleaved video frames,
wherein each video frame has a type;
a graphics processing circuit comprising a first buffer, a second buffer, and a controller circuit,
wherein the first buffer is arranged to buffer a first part of the 3D overlay information and the second buffer is arranged to buffer a second part of the 3D overlay information,
wherein the controller circuit determines the type of a video frame,
wherein the type is one of a main video frame comprising main video information and an additional video frame comprising additional video information;
a mixer circuit arranged to overlay the first part of the 3D overlay information over the main video information when the type of the frame is the main video frame, and to overlay the second part of the 3D overlay information over the additional video information when the type of the video frame is the additional video frame, to produce an overlayed video frame; and
an output circuit for outputting the overlayed video frame,
wherein the video information is updated at a video rate,
wherein the first part of the 3D overlay information and the second part of the 3D overlay information is updated at an overlay rate, wherein the overlay rate is different than the video rate.

* * * * *